(12) United States Patent
Jarr et al.

(10) Patent No.: US 10,990,601 B1
(45) Date of Patent: Apr. 27, 2021

(54) DYNAMIC OPTIMIZATION OF VARIANT RECOMMENDATIONS

(71) Applicant: A9.com, Inc., Palo Alto, CA (US)

(72) Inventors: Alexis Bogie Jarr, Seattle, WA (US); Anna Fumiko Trowbridge, Seattle, WA (US); Sean Michael Bell, North Bend, WA (US); Justin Maner, Auburn, WA (US); Ruben Lozano-Aguilera, Seattle, WA (US); Nicholas William Mahen, Seattle, WA (US)

(73) Assignee: A9.COM, INC., Palo Alto, CA (US)

( * ) Notice: Subject to any disclaimer, the term of this patent is extended or adjusted under 35 U.S.C. 154(b) by 382 days.

(21) Appl. No.: 15/918,650

(22) Filed: Mar. 12, 2018

(51) Int. Cl.
  *G06F 16/00* (2019.01)
  *G06F 16/2457* (2019.01)
  *G06Q 30/06* (2012.01)
  *G06F 16/248* (2019.01)
  *G06F 16/28* (2019.01)

(52) U.S. Cl.
  CPC ...... *G06F 16/24578* (2019.01); *G06F 16/248* (2019.01); *G06F 16/285* (2019.01); *G06Q 30/0603* (2013.01); *G06Q 30/0625* (2013.01)

(58) Field of Classification Search
  CPC ............. G06F 16/24578; G06F 16/285; G06F 16/248; G06Q 30/0603; G06Q 30/0625
  See application file for complete search history.

(56) References Cited

U.S. PATENT DOCUMENTS

| | | | | |
|---|---|---|---|---|
| 6,026,370 A | * | 2/2000 | Jermyn | G06Q 20/202 |
| | | | | 235/375 |
| 9,135,396 B1 | * | 9/2015 | Kalinin | G06F 16/285 |
| 10,102,560 B1 | * | 10/2018 | Kurup | G06Q 30/0631 |
| 2003/0217052 A1 | * | 11/2003 | Rubenczyk | G06F 16/951 |
| 2005/0197883 A1 | * | 9/2005 | Kettner | G06Q 10/087 |
| | | | | 705/7.35 |

(Continued)

OTHER PUBLICATIONS

Krishnamoorthy Srikumar et al., "Personalized Product Selection in Internet Business", Journal of Electronic Commerce Research, vol. 5, No. 4, 2004, pp. 216-227 (Year: 2004).*

(Continued)

*Primary Examiner* — Jared M Bibbee
(74) *Attorney, Agent, or Firm* — Hogan Lovells US LLP

(57) ABSTRACT

In various embodiments, when a search query for certain products in an electronic catalog is received, a group of related products that are responsive to the search query may be identified. The product variants may be defined by one or more attributes. Each attribute may have one or more attribute values. The product variants may be first classified according to an attribute. One or more representative classes may be selected from the classes, for example, based on sales data (or other metric) and/or meaningful differentiation between the classes. Then a representative product variant from each class may be selected and returned as search results in response to the search query. In some embodiments, selection of the representative product variant from each class may be based on one or more factors, such as sales data, the particular customer's purchase or browsing history, cost, the search query, availability, among others.

20 Claims, 8 Drawing Sheets

(56) References Cited

U.S. PATENT DOCUMENTS

| | | | | |
|---|---|---|---|---|
| 2012/0226698 A1* | 9/2012 | Silvestre | ................ | G06Q 30/02 707/741 |
| 2013/0060662 A1* | 3/2013 | Carlson | ................ | G06Q 30/06 705/26.61 |
| 2013/0218527 A1* | 8/2013 | Callahan | ................ | G06F 30/00 703/1 |
| 2015/0161717 A1* | 6/2015 | Deleuran Mumm | ................ | G06F 3/04883 705/27.2 |
| 2015/0310046 A1* | 10/2015 | Ashoori | ............ | G06F 16/2246 707/797 |
| 2016/0027051 A1* | 1/2016 | Gross | ................... | G06Q 50/16 705/14.54 |
| 2016/0041951 A1* | 2/2016 | Shinzato | ................ | G06F 40/253 704/10 |
| 2016/0048897 A1* | 2/2016 | Somaiya | ................ | G06F 16/338 705/26.3 |
| 2016/0125517 A1* | 5/2016 | Holcomb | ........... | G06Q 30/0641 705/26.7 |
| 2016/0162607 A1* | 6/2016 | Callahan | ................ | G06F 30/00 703/1 |
| 2017/0132627 A1* | 5/2017 | Phillips | ................ | G06Q 20/401 |
| 2017/0249689 A1* | 8/2017 | O'Neill | ................ | G06Q 10/087 |
| 2018/0150869 A1* | 5/2018 | Finnegan | ........... | G06Q 30/0239 |

OTHER PUBLICATIONS

Yue Wang et al., "A Naïve Bayes approach to map customer requirements to product variants", Jun. 29, 2013, pp. 501-509 (Year: 2013).*

Frutos et al., "Social Media engagement as an e-commerce driver, a consumer behavior perspective", pp. 1-6 (Year: 2014).*

* cited by examiner

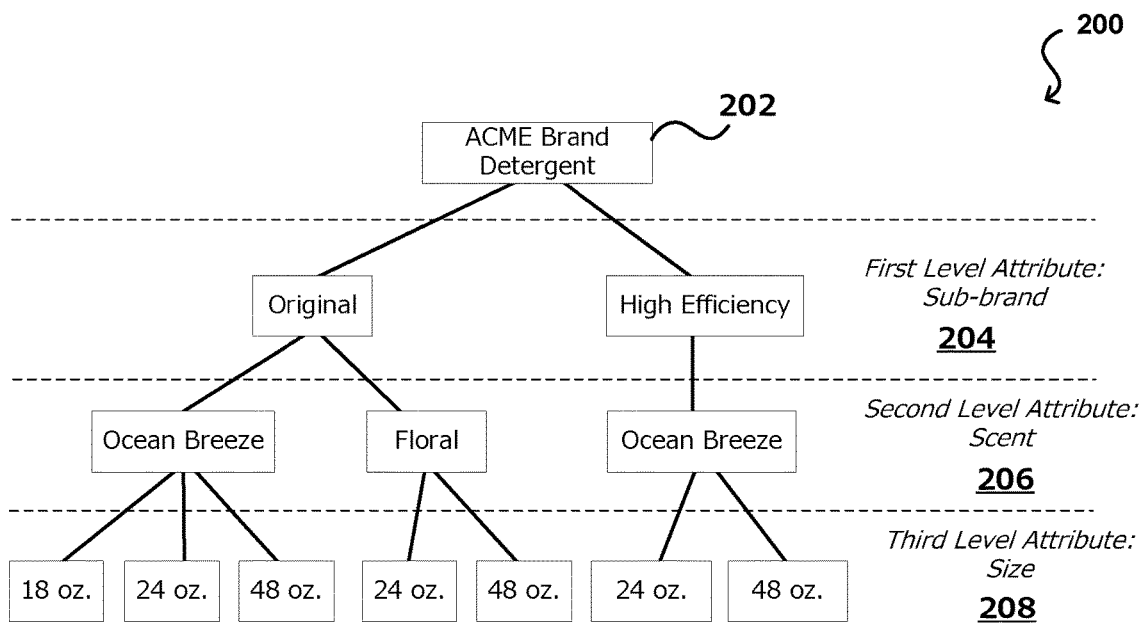
FIG. 2A
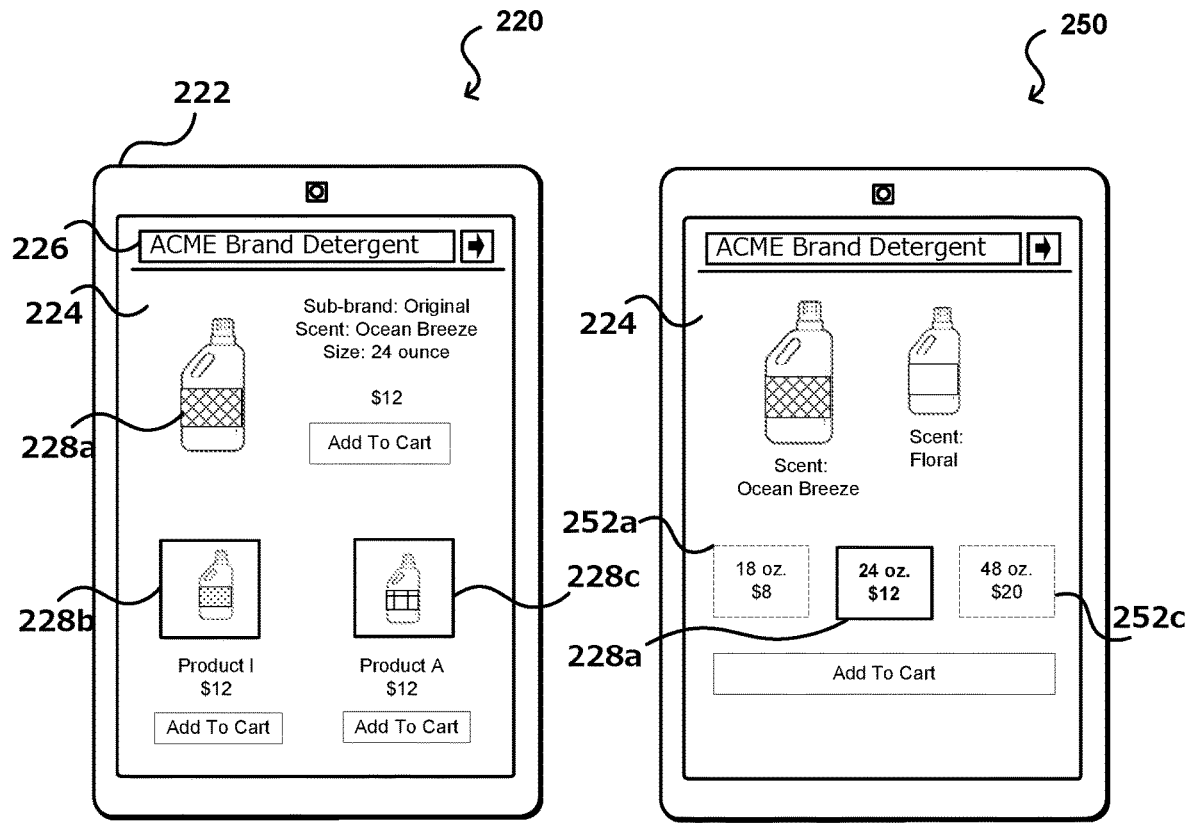
FIG. 2B
FIG. 2C

US 10,990,601 B1

DYNAMIC OPTIMIZATION OF VARIANT RECOMMENDATIONS

BACKGROUND

With the expanding use of computer networks, such as the Internet, an increasing amount of commerce is conducted electronically. For example, consumers are increasingly utilizing electronic marketplaces to purchase all kinds of products (e.g., goods and services). Countless products are for sale online, even within a single electronic marketplace. Allowing user to be able to quickly and easily find the products they are looking for is a key component of the user experience as well as for driving sales and retaining customers. However, although the nature of electronic commerce and the conventional technology that enables it provides many advantages, it also presents unique challenges. For example, because "products" are generally represented as entries in a database, this allows an electronic marketplace to provide large numbers of products for consumption, often more than would be practical in a physical store. While this enables a great product selection, the large number of options available may also make it difficult or time consuming for users to find the particular product they want or make it more difficult for the use to choose between so many product options, which may lead to a sub-optimal user experience.

BRIEF DESCRIPTION OF THE DRAWINGS

Various embodiments in accordance with the present disclosure will be described with reference to the drawings, in which:

FIG. 2A illustrates an example attribute hierarchy, in accordance with example embodiments.

FIG. 2B illustrates an example interface showing optimal product variants based on a first level attribute, in accordance with various embodiments of the present disclosure.

FIG. 2C illustrates an example interface showing optimal product variants based on a second level attribute, in accordance with various embodiments of the present disclosure.

DETAILED DESCRIPTION

Figure 1:
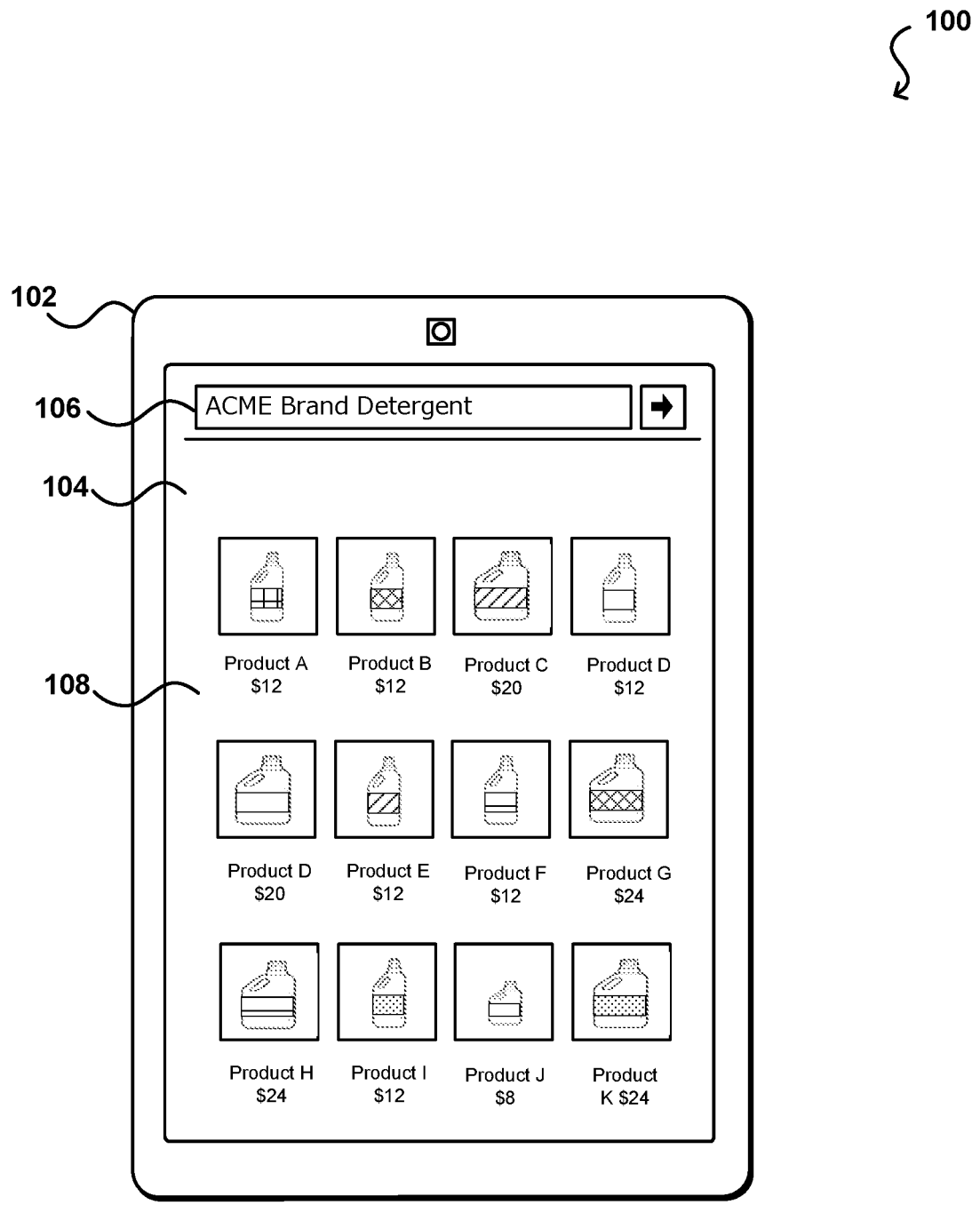
FIG. 1 illustrates an example computing device providing access to an electronic marketplace.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches for managing and presenting content in a database. In particular, various embodiments aggregate product variants according to product attributes (e.g., size, scent, color) and determines recommended variants at various levels of an attribute hierarchy based on data such as sales data, search query, and customer profile. Thus, when a customer searches for a product that has numerous variants, they are presented with a recommended variant. As the customer narrows the field by selecting various attribute values, they are presented with a recommended variant based on their selected attribute values.

In an electronic marketplace, many products are available in a variety of different product variants, as defined by combinations of one or more attributes such as size, scent/flavor, function, and the like. As the number of variants increases, it may become increasingly difficult for customers to browse through the variants, recognize and evaluate the differentiations between variants, and identify or decide on the product variant they want. For example, a certain brand of laundry detergent may have a large number of product variants, as defined by attributes such as bottle size, scent, or special purpose. Thus, with conventional e-commerce technology, a search query for the brand of laundry detergent may return all the product variants, making it difficult for the customer to wade through all the options. The systems and methods of the present disclosure provide for organizing the products variants by attributes and guiding the user through such a decision making process based on a hierarchy of the attributes while presenting the user with a recommended product variant at each step.

In various embodiments, when a search query for certain products in an electronic catalog is received, a group of related products from the electronic catalog that are responsive to the search query may be identified. However, instead of returning the entire group of products as search results, a collapsed and interactive interface is generated that guides the user through the products, presenting only a optimized subset of options at a time. The optimized subset of options represents the subset of products that are most likely to be of interest to the user based on attributes they have or have not selected. In order to provide this experience, the available product variants within the group of related products is identified. As mentioned, the product variants may be defined by one or more attributes. In some embodiments, the attributes are related through an attribute hierarchy, which may be based on a purchase decision tree for that type of product. Each attribute may have one or more attribute values. Thus, a certain product variant may be defined by a unique combination of attribute values, such as a 12 ounce bottle of floral scented hypoallergenic detergent. The product variants may be first classified according to a first level attribute in the attribute hierarchy, in which each attribute value of the first attribute constitutes a class. The first level attribute may be selected based on the attribute hierarchy in combination with keywords of the search query.

One or more representative classes may be selected from the classes, for example, based on sales data (or other metric) and/or meaningful differentiation between the classes. For example, if the attribute is size and there are a plurality of size values (e.g., 12 oz, 16 oz, 24 oz, 32 oz, 64 oz), the one or more representative classes may include a relative "small" size, a "medium" size, and a "large" size to provide a representation of the range and meaningful distinction. Sales data may also indicate which of the different sizes are most popular with customer, which may also influence the selection of the representative classes. Then a representative product variant from each class may be selected and returned as search results in response to the search query. In some embodiments, selection of the representative product variant from each class may be based on one or more factors, such as sales data, the particular customer's purchase or browsing history, cost, the search query, availability, among others. Selection of the attribute, the representative classes, and the representative product within each representative class is all optimized for predicting a subset of product variants that will be of most interest to the customer. In various embodiments, these steps may be performed and updated dynamically, allowing new products or changes in sales trends or user preferences to be taken into consideration.

Various other features and application can be implemented based on, and thus practice, the above described technology and presently disclosed techniques. Accordingly, approaches in accordance with various embodiments improve the functionality of computers by providing a means of managing expansive amounts of entries in a database. Thus, rather than operating based on conventional functions such as filtering and sorting, the present approaches enable computing systems to dynamically and automatically determine the optimal content in the database to present to a user. Various other applications, processes, and uses are presented below with respect to the various embodiments, each of which improves the operation and performance of the computing device(s) on which they are implemented.

FIG. 1 illustrates an example 100 computing device 102 providing access to an electronic marketplace 104, in accordance with various embodiments. In this example, a computing device 102 provides access to an electronic marketplace 104, in accordance with various embodiments. Although a tablet computing device is shown in this example, it should be understood that various other types of electronic devices that are capable of determining and processing input and providing output can be used in accordance with various embodiments discussed herein. These devices can include, for example, smart phones, e-book readers, desktop computers, notebook computers, personal data assistants, video gaming consoles or controllers, smart televisions, and portable media players, wearable computers (e.g., glasses, watches, etc.) among others. Further, the elements illustrated can be part of a single device, while at least some elements illustrated and otherwise utilized for such a device can be provided as one or more peripheral devices or accessories within the scope of the various embodiments.

In a conventional system, a user can search for products (e.g., goods and services) in an electronic item catalog of an electronic marketplace. A catalog of items (including each item's description) may be organized into a "browse tree" structure in order to facilitate searching. A browse tree permits users to "browse" through various items, which are arranged in the form of a hierarchical tree. The browse tree may be displayed via a user interface as a collection of hyperlinks, each hyperlink corresponding to a section of the tree. A user can find an item by navigating through the various nodes of the browse tree.

Additionally, in many situations, the electronic marketplace may provide a search interface 106 that enables a user to search for a desired item. The search interface may return search results based on relevance of particular items to the customer's search query. In the example of FIG. 1, a search query has been received and a set of search results 108 determined and returned for presentation in response to the request. In this example the user has submitted a query including a keyword and the returned search results have been determined to be relevant in some way to the keyword. This can be due to a categorization of the results, keywords associated with the results, or tags applied to the result, among other such options. The user can scroll or otherwise navigate through the results to determine whether any of the results are of interest to the user. It might be the case, however, that there were too many results returned and the user is not finding items of interest in an initial subset of the results. Accordingly, the user might want to narrow the query in order to obtain search results that are more relevant or of interest to the user based on the user's current interest.

In some embodiments, a search query may be associated with a user navigating to a particular set of items, such as through a product category link (e.g., "pants), navigating to a brand page, or any other page associated with a collection of items. A link to such a page or collection of item may be accessed by a user on a website internal to or external to the electronic marketplace. For example, a user may click on a URL to the electronic marketplace. The URL may direct to a particular webpage on the electronic marketplace such as a brand page. The URL may also include dynamically generated information following the path such as a query string that is automatically passed to the electronic marketplace as a keyword query. In either case, and in other search or navigation methods, a search query is received at the electronic marketplace and a product search, display, or recommendation process may be initiated.

Additionally, many products may be available in a variety of different product variants, as defined by combinations of one or more attributes such as size, scent/flavor, function, and the like. As the number of variants increases, it may become increasingly difficult for customers to browse through the variants, recognize and evaluate the differentiations between variants, and identify or decide on the product variant they want. For example, a certain brand of laundry detergent may have a large number of product variants, as defined by attributes such as bottle size, scent, or special purpose. Thus, with conventional e-commerce technology, a search query for the brand of laundry detergent may return all the product variants, making it difficult for the customer to wade through all the options. Thus, while e-commerce enables a large product selection, the large number of options available may also make it difficult or time consuming for users to find the particular product they want or make it more difficult for the use to choose between so many product options, which may lead to a sub-optimal user experience. Allowing user to be able to quickly and easily find the products they are looking for is a key component of the user experience as well as for driving sales and retaining customers. The systems and methods of the present disclosure provide for organizing the products variants by attributes and guiding the user through such a decision making process based on a hierarchy of the attributes while presenting the user with a recommended product variant at each step.

FIG. 2A illustrates an example attribute hierarchy 200 for ACME brand detergent 202, an example product with product variants, in accordance with example embodiments. The attribute hierarchy 200 may represent one way, among various ways, of organizing and relating attributes and the product variants. Product variants may be defined by one or more attributes. Each attribute has a plurality of attribute values. Thus each variant may be defined by a unique combination of attribute values. In this example, a first level attribute 204 is a "sub-brand" attribute with attribute values of "original" and "high efficiency. In this example, the ACME brand detergent product variants can first be classified into either "original" or "high efficiency" sub-brands. A second level attribute 206 in this example is a "scent" attribute, with attribute values of "ocean breeze" and "flora". Thus, each product variant can also be classified by scent. In this example, the product variants that have the "original" attribute may be classified into either "ocean breeze" scent or "floral" scent. The product variants that have the "high efficiency" sub-brand attribute value all also have the "ocean breeze" scene attribute value. A third level attribute 208 in this example is a "size" attribute, with attribute values of "18 oz.", "24 oz.", and "48 oz.". Thus, each product variant can also be classified by size. In this example, the product variants that have the "original" attribute value and the "ocean breeze" attribute value may be classified into either "18 oz.", "24 oz.", and "48 oz." size attribute values. In some embodiments, the attribute hierarchy may be based on a purchase decision tree, such as based on general or average consumer behavior or the particular behavior of a particular user, as defined by browsing history, purchase history, and other data. In some embodiments, the same attributes may be organized into a different hierarchy. For example, the "size" attribute may be the second level attribute and the "scent" attribute may be the third level attribute.

In some embodiments, in additional to an attribute hierarchy, a product variant may have additional attributes that are not necessarily in the attribute hierarchy. For example, an attribute of a product variant may include a product offer. A product offer may refer to a particular offer of the product for consumption (e.g., sale). Attributes may also include a seller associated with the product offer, price, product rating or reviews, seller ratings or reviews, shipping details, among others.

FIG. 2B illustrates an example interface 220 showing optimal product variants based on a first level attribute. In this example, a computing device 222 provides access to an electronic marketplace 224 in accordance with various embodiments. Although a tablet computing device is shown in this example, it should be understood that various other types of electronic devices that are capable of determining and processing input and providing output can be used in accordance with various embodiments discussed herein. These devices can include, for example, smart phones, e-book readers, desktop computers, notebook computers, personal data assistants, video gaming consoles or controllers, smart televisions, and portable media players, wearable computers (e.g., glasses, watches, etc.) among others. Further, the elements illustrated can be part of a single device, while at least some elements illustrated and otherwise utilized for such a device can be provided as one or more peripheral devices or accessories within the scope of the various embodiments.

In this example, the electronic marketplace 224 may provide a search interface 226 that enables a user to search for a desired item by entering a search query (e.g., keywords). In various embodiments, when a search query for a certain product is received, a group of related products from the electronic catalog that are responsive to the search query may be identified. Specifically, the group of related products may include a variety of different product variants, as defined by combinations of one or more attributes such as size, scent/flavor, function, and the like. In the illustrated embodiment, the search query is for a certain brand of laundry detergent, which may have a large number of product variants, as defined by attributes such as bottle size, scent, special purpose (e.g., high efficiency, hypoallergenic). Despite the large number of products that may be responsive to such a search query, instead of returning the entire group of products as search results, the present system provides a collapsed and interactive interface is generated that guides the user through the products, presenting only an optimized subset of options at a time. The optimized subset of options represents the subset of products that are most likely to be of interest to the user. As illustrated in the example of FIG. 2B, in accordance with some embodiments of the present disclosure, when a search query for a product is made, representative product variants 228a, 228b, 228c of a first attribute level are presented as initial search results. In some embodiments, a top product variant 228a is also indicated as such, such as by being large than the others 228b, 228c.

In order to select the product variants to present as the optimal product variants 228a, 228b, 228c, the available product variants responsive to the search query may first be identified. As mentioned, the product variants may be defined by one or more attributes. In some embodiments, the attributes are related through an attribute hierarchy, which may be based on a decision tree (e.g., purchase decision tree) for that type of product. Each attribute may have one or more attribute values. Thus, a certain product variant may be defined by a unique combination of attribute values. The product variants may be first classified according to a first level attribute in the attribute hierarchy, in which each attribute value of the first attribute constitutes a class. The first level attribute may be selected based on the attribute hierarchy in combination with keywords of the search query. One or more representative classes may be selected from the classes, for example, based on sales data (or other metric) and/or meaningful differentiation between the classes. For example, if the attribute is size and there are a plurality of size values (e.g., 12 oz, 16 oz, 24 oz, 32 oz, 64 oz), the one or more representative classes may include a relative "small" size, a "medium" size, and a "large" size to provide a representation of the range and meaningful distinction. Sales data may also indicate which of the different sizes are most popular with customer, which may also influence the selection of the representative classes. Then a representative product variant 228a, 228b, 228c from each class may be selected and returned as search results in response to the search query. In some embodiments, selection of the representative product variant from each class may be based on one or more factors, such as sales data, the particular customer's purchase or browsing history, cost, the search query, availability, among others. Selection of the attribute, the representative classes, and the representative product within each representative class is all optimized for predicting a subset of of product variants that will be of most interest to the customer. In various embodiments, these steps may be performed and updated dynamically, allowing new products or changes in sales trends or user preferences to be taken into consideration.

In some embodiments, the displayed product variants are first order search results as the product variants represent the optimal product variants with respect to a first level attribute. The user is provided with the option to explore product variants within a certain attribute value of the first level attribute. For example, the user may select to view additional product variants that have a certain attribute value rather than the selected product variant for that attribute value. This may be indicated through a user input, such as tapping an interface element representing a class. In this example, the user may tap on the product image or description as the user input to view additional variants that have the same first level attribute value as the tapped product. Specifically, the user may tap on product 228a to view additional product variants having the sub-brand attribute value of "original". FIG. 2C illustrates an example interface of the electronic marketplace 224 when the user taps on product 228a. Thus, the product variants within the selected class are further classified based on a second level attribute (e.g., scent). In this example, the variants may be further defined by size, where a plurality of representative size options 252a, 252b, 252c are selected and presented as search results. In some embodiments, there may be additional sizes available than those selected as representative sizes.

Figure 3:
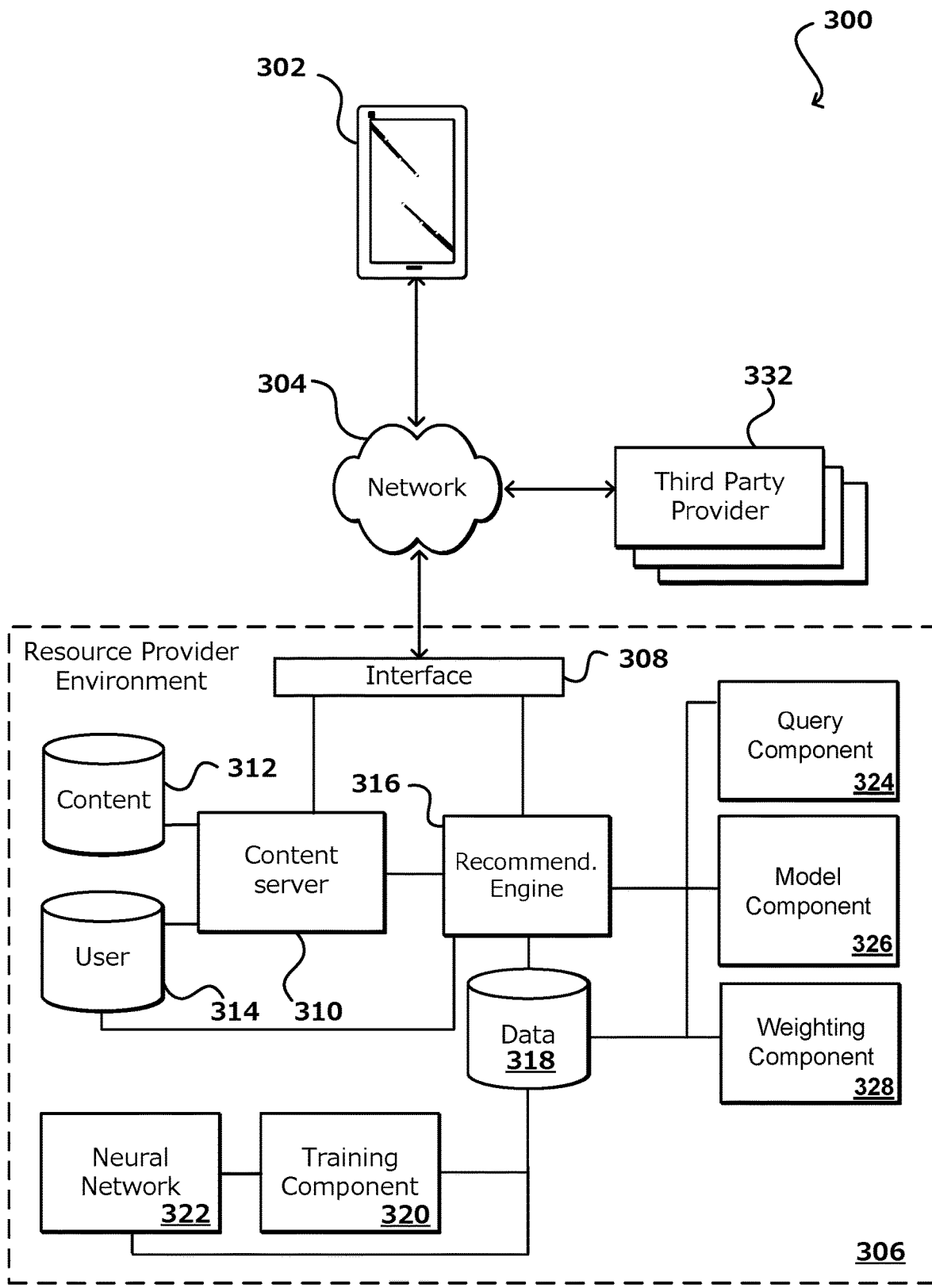
FIG. 3 illustrates an example environment in which aspects of the various embodiments can be implemented, in accordance with various embodiments of the present disclosure.

FIG. 3 illustrates an example environment 300 in which aspects of the various embodiments can be implemented. Specifically, the example environment 300 includes a recommendation engine that can determine optimal product variants to present as search results in response to a search query for a product with many variants. In this example, a computing device 302 is able to make a call or request across one or more networks 304 to a content provider environment 306. The network(s) can include any appropriate network, such as the Internet, a local area network (LAN), a cellular network, an Ethernet, or other such wired and/or wireless network. The content provider environment 306 can include any appropriate resources for providing content from a resource provider, as may include various servers, data stores, and other such components known or used for providing content from across a network (or from the "cloud").

In this example, a request received to the content provider environment 306 can be received by an interface layer 308 of the environment. As known for network environments, the interface layer can include components such as interfaces (e.g., APIs), load balancers, request and/or data routers, and the like. If the request is a request for content, such as for content for a page to be displayed in an application, information for the request can be directed to one or more content managers 310 and/or content servers, which can obtain the content from a content data store 314 or other such repository to be sent back across the network(s) to the computing device. In some embodiments, information for the request might also be compared against user data in a user data store 312 or other such location do determine, for example, whether the user has access rights to that content. In some embodiments user data might also be analyzed to determine which type of content to provide additional supplemental content to provide with the primary content, and the like. In some embodiments, content, such as product data, may be provided by a third party provider 332.

In various embodiments, the optimal product variants may be determined by a recommendation engine 316 and provider by the content server 310 based upon data stored in the data repository 318 or determined using a query component 324 or model component 326, among other such options. In some embodiments the recommendation engine 316 may access a weighting component 328 or other such mechanism to weigh the data, such as various components of training data, in determining the optimal product variants. In various embodiments, determining the optimal product variants may include ranking product variants according to one or more metrics or criteria, in which all or a subset of the plurality of product variants response to a certain selection condition or search query are assigned a score with respect to the one or more metrics or criteria. An optimal product variants may be one whose match score is higher than a threshold score or ranked within a certain number of positions. The individual match scores of the optimal product variants can be determined at least in part using neural networks 322 or other machine learning techniques. The training component 320 can perform the training on the models and provide the resulting results and/or trained models for use in determining the individual match scores or the recommended products. In certain embodiments, training a neural network may involve significant use of computation resources and time, such that this may correspond to a preparatory step to servicing search requests and/or performed relatively infrequently with respect to search request servicing and/or according to a schedule. According to some embodiments, training data and respective can be located in a data store 318.

Figure 4:
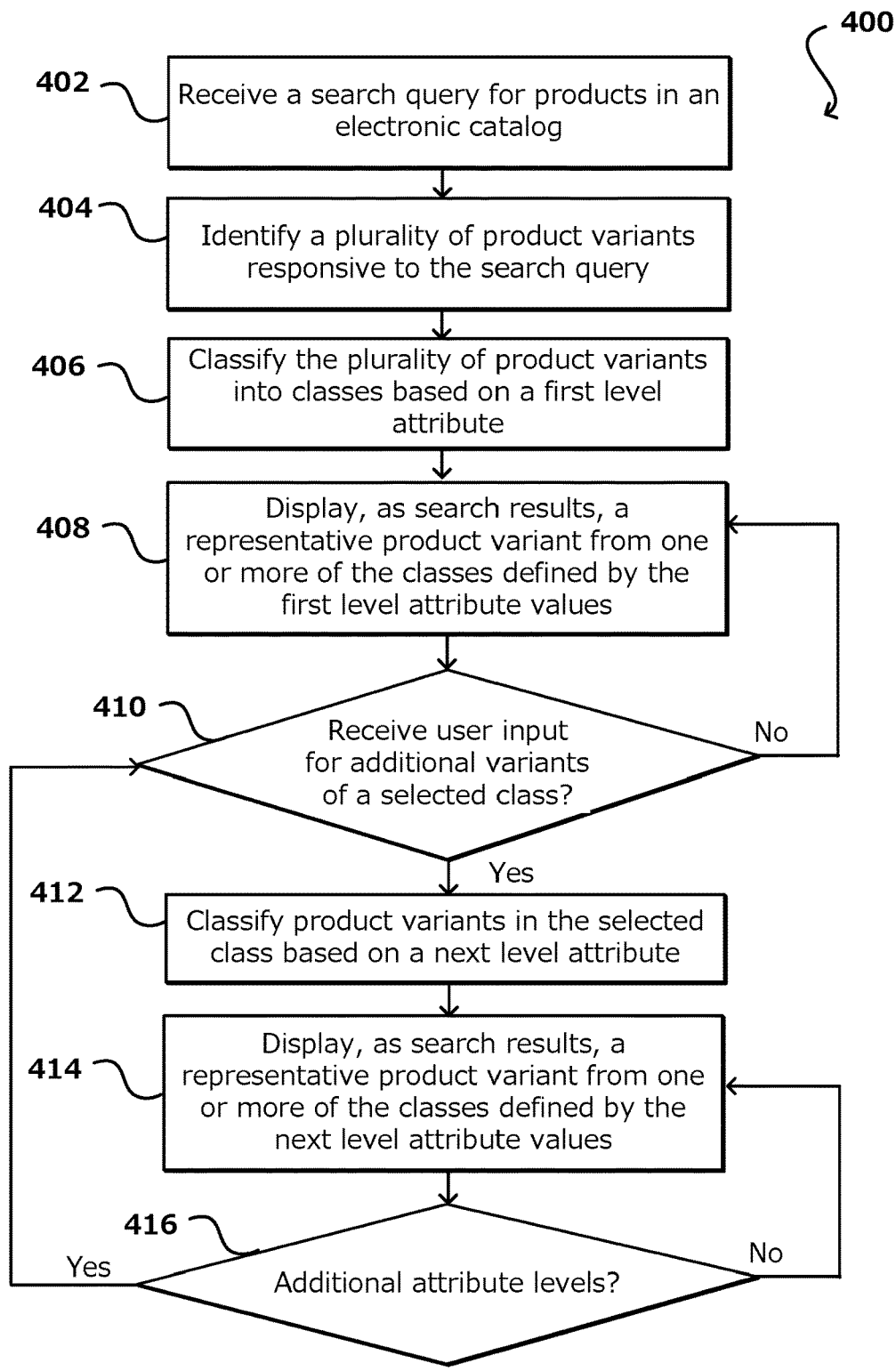
FIG. 4 illustrates an example process of providing search results with optimized and expandable product variants based on attribute hierarchy, in accordance with various embodiments of the present disclosure.

FIG. 4 illustrates an example process of providing search results with optimized and expandable product variants based on attribute hierarchy, in accordance with various embodiments. It should be understood that, for any process discussed herein, there can be additional, fewer, or alternative steps performed in similar or alternative orders, or in parallel, within the scope of the various embodiments. In this example, a search query for products in an electronic catalog is received 402, such as based on a user input from a client device. In various embodiments, the search query may refer to any type of query (keyword search, category or hierarchical navigation, search result refinements, pages of collections of items, internal or external link, among others) that initiates a process of providing one or more items to the client device. The search query may be for a product that has a plurality of product variants. Thus, the plurality of product variants may be identified 404, such as from the electronic catalog of other database. The product variants may be defined by a plurality of attributes. The one or more attributes may be organized in an attribute hierarchy, such as the example described in FIG. 2A. The plurality of attributes may include a first level attribute, and subsequent levels (e.g., second, third) depending on how many attributes there are in the attribute hierarchy. The plurality of product variants are classified 406 into first order classes based on the first level attribute. A representative product variant is selected from one or more of the classes defined by the first level attribute values. In some embodiments, the representative product variant may be selected based on various factors, such as popularity of the product variant (e.g., indicated by sales data). The representative product variant may also be tailored to the particular user based on the user's purchase history, which may indicate a penchant or preference. For example, a user may have purchased a significant number of products having an "unscented" attribute value. Thus, the selected represented product variant may have the "unscented" attribute value. The selected representative product variants are displayed 408 as search results in the response to the search query.

Specifically, the displayed product variants are first order search results as the product variants represent the optimal product variants with respect to the first level attribute. The user is provided with the option to explore product variants within a certain attribute value of the first level attribute. For example, the user may select to view additional product variants that have a certain attribute value rather than the selected product variant for that attribute value. This may be indicated through a user input, such as tapping an interface element representing a class. Thus, it can be determined 410 if such a user input is received. If a user input is received, the product variants within the selected class are further classified 412 into classes based on a next level attribute. A representative product variant is selected from one or more of the classes defined by the next level attribute values. The selected representative product variants are then displayed 414 as search results in the response to the search query. It can then be determined 416 if there are additional attribute levels in the attribute hierarchy. If there are, then it can again be determined 410 whether a user input to view additional product variants is received. This can iterate until there are no more attribute level left to explore.

Figure 5:
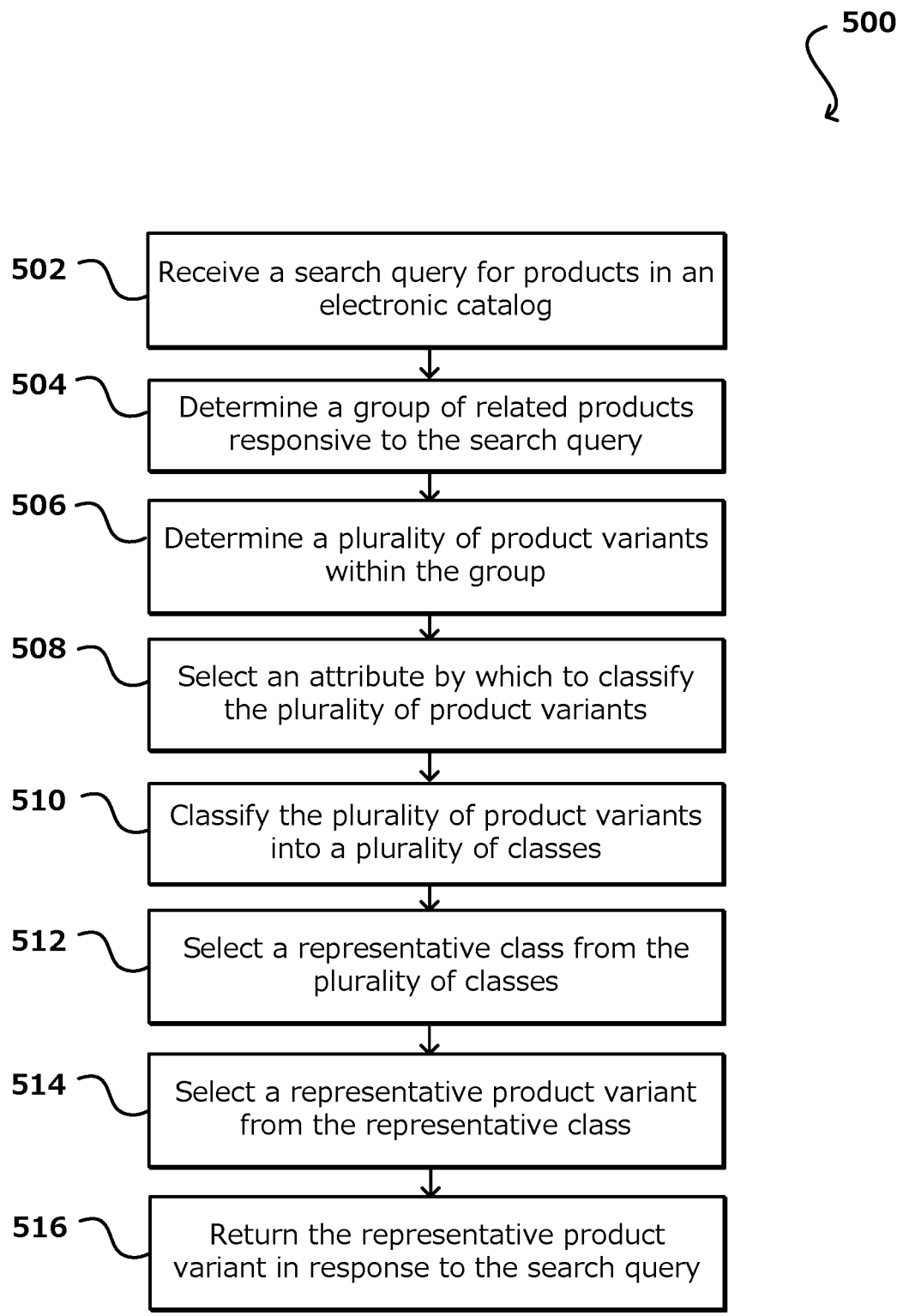
FIG. 5 illustrates an example process of determining optimal product variants in response to a search query, in accordance with various embodiments of the present disclosure.

FIG. 5 illustrates an example process of determining optimal product variants in response to a search query, in accordance with various embodiments. In this example, a search query is received 502 from a client device for products in an electronic catalog. A group of related products that are responsive to the search query may be identified 504 from the electronic catalog. In some embodiments, the group of related product may include a plurality of product variants that are defined by one or more attributes. Thus, the plurality of product variants within the group of related products are identified 506. In some embodiments, the one or more attributes may be organized in an attribute hierarchy, such as described in FIG. 2A. In some embodiments, the attribute hierarchy may represent a purchase decision tree or other means of organizing and relating the plurality of product variants.

An attribute may then be selected 508 from the one or more attributes by which to classify the product variants. The attribute (e.g. color) may have a plurality of different possible attribute values (e.g., red, blue, green). In some embodiments, the attribute may be selected based at least in part on the hierarchy of attribute and/or one or more parameters specified in the search query. For example, if the search query specifies "floral scent ACME brand laundry detergent", the attribute may be an attribute other can scent, such as size or function, since the attribute value for the scent attribute has already been dictated by the search query and all the product variants response to the search query should have the attribute value "floral" for the scent attribute. The plurality of product variants are classified 510 into classes based on their attribute value with respect to the selected attribute. Each class may include one or more product variants that share the same attribute value for the selected attribute, but which may have different attribute values for other attributes.

A representative class may be selected 512 from the plurality of classes, and a representative product variant may be selected from the representative class. The representative product may be returned as an optimal product variant in response to the search query. In some embodiments, a plurality of representative classes may be selected 514, and a respective product for each of the plurality of representative classes is returned 516 in response to the search query. The representative classes may be selected based on sales data (or other metric) and/or a degree of meaningful differentiation between the classes. For example, if the attribute is size and there are a plurality of size values (e.g., 12 oz, 16 oz, 24 oz, 32 oz, 64 oz), the one or more representative classes may include a relative "small" size, a "medium" size, and a "large" size to provide a representation of the range and meaningful distinction. Sales data may also indicate which of the different sizes are most popular with customer, which may also influence the selection of the representative classes.

In some embodiments, selection of the representative product variant from each class may be based on one or more factors, such as sales data, the particular customer's purchase or browsing history, cost, the search query, availability, among others. Selection of the attribute, the representative classes, and the representative product within each representative class is all optimized for predicting a subset of product variants that will be of most interest to the customer. In various embodiments, these steps may be performed and updated dynamically, allowing new products or changes in sales trends or user preferences to be taken into consideration.

Figure 6:
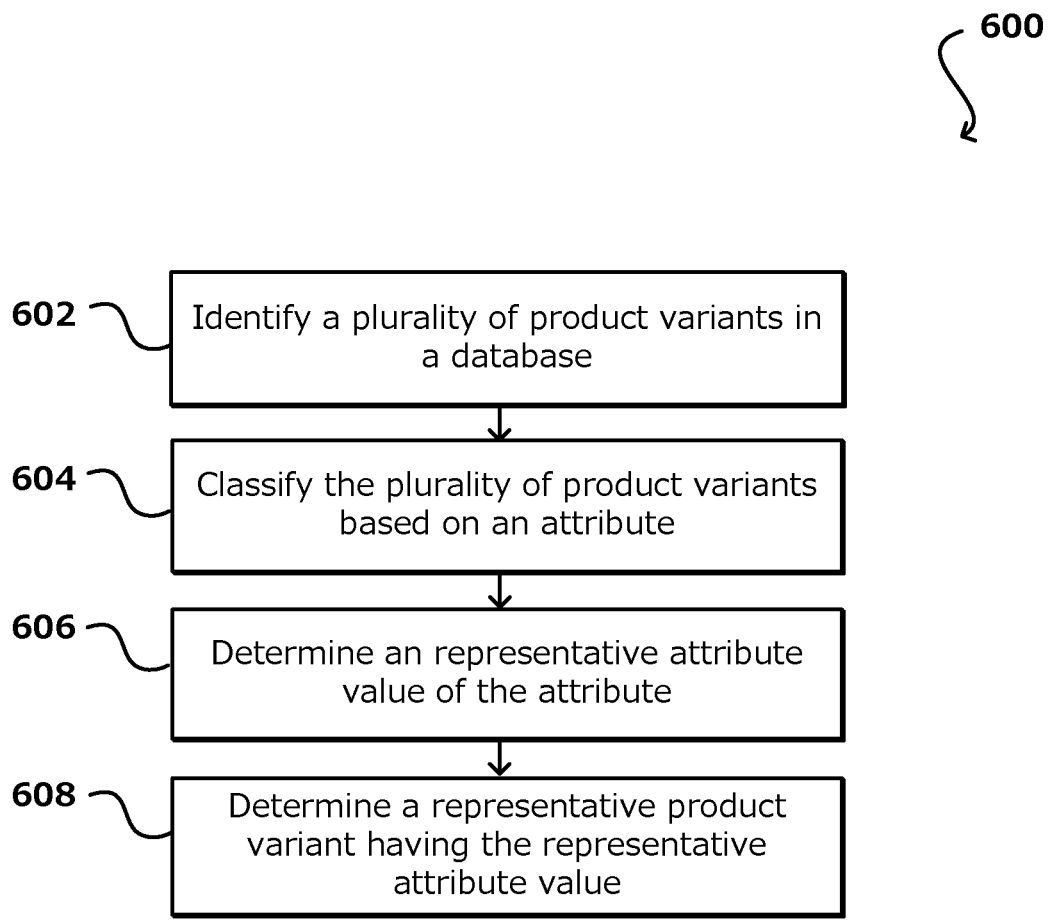
FIG. 6 illustrates an example process of determining optimal product variants for a product family, in accordance with various embodiments of the present disclosure.

FIG. 6 illustrates an example process of determining optimal product variants for a product family, in accordance with various embodiments. In this example, a plurality of product variants in a database associated with a search query received from a client device are identified 602. As mentioned, the plurality of product variants are defined by one or more attributes, such as size, color, flavor, function, and the like. Each attribute may include a plurality of different attribute values. For example, each distinct product variant has a unique combination of attribute values. Thus, the plurality of product variants can be classified 604 based on an attribute selected from the one or more attributes, such that each class may include one or more product variants that share the same attribute value for the selected attribute, but which may have different attribute values for other attributes. In some embodiments, the attribute may be selected or determined based at least in part on a hierarchy between the one or more attributes. The attribute may also be selected or determined based at least in part on one or more keywords in the search query.

A representative attribute value may be determined 606 from the plurality of attribute values based on various factors such as engagement data, and a product variant may be determined 608 from the plurality of product variants having the attribute value. In some embodiments, the attribute value may be selected or determined based at least in part on engagement data of with the plurality of product variants with respect to the plurality of attribute values. In some embodiments, one or more attribute values may be selected or determined from the plurality of attribute values based at least in part on a degree of distinction between the one or more attribute values. In some embodiments, selection of the representative product variant from each class may be based on one or more factors, such as sales data, the particular customer's purchase or browsing history, cost, the search query, availability, among others. In various embodiments, these steps may be performed and updated dynamically, allowing new products or changes in sales trends or user preferences to be taken into consideration.

In some embodiments, a product variant may be associated with multiple "offers", such as from different sellers on a multi-seller e-commerce platform. For example, multiple seller may offer the same product for sale. However, in some cases, the offers may be somewhat different from each other in terms of price, shipping cost and time, quality of product description, availability, or other conditions. Thus, when the selected product variant may be associated with a plurality of product offers, an optimal product offer may be selected from the plurality of product offers. In some embodiments, the optimal product offer may be selected based at least in part on at least one of a quality measure of the product offer, the seller, seller profile, ratings, reviews, availability of the product offer, or another condition associated with the product offer. Examples of a quality measure of the product offer may include the price, such as compared to other offers for the product variant or other comparable product variants, the quality of the product description, shipping and return details, among others.

Figure 7:
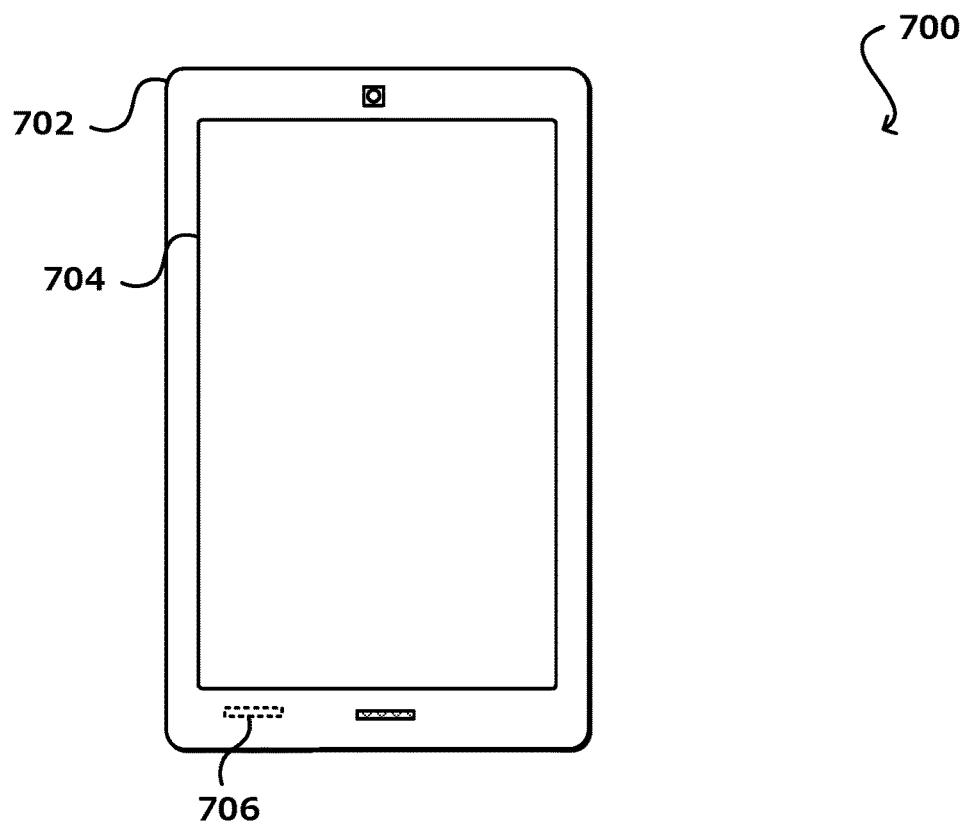
FIG. 7 illustrates an example computing device that can be used, in accordance with various embodiments of the present disclosure.

FIG. 7 illustrates an example computing device 700 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), television set top boxes, and portable media players, among others. In this example, the computing device 700 has a display screen 704 and an outer casing 702. The display screen under normal operation will display information to a user (or viewer) facing the display screen (e.g., on the same side of the computing device as the display screen). As discussed herein, the device can include one or more communication components 706, such as may include a cellular communications subsystem, Wi-Fi communications subsystem, BLUETOOTH® communication subsystem, and the like.

Figure 8:
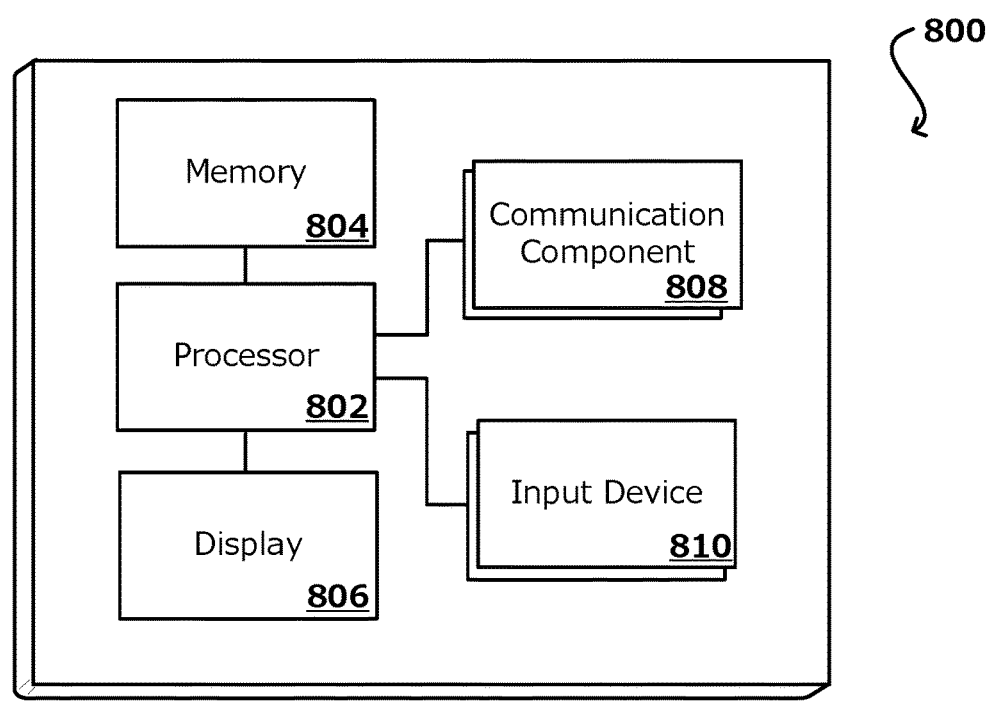
FIG. 8 illustrates a set of basic components of one or more devices of the present disclosure, in accordance with various embodiments of the present disclosure.

FIG. 8 illustrates a set of basic components of one or more devices 800 of the present disclosure. In this example, the device includes at least one processor 802 for executing instructions that can be stored in a memory device or element 804. As would be apparent to one of ordinary skill in the art, the device can include many types of memory, data storage or computer-readable media, such as a first data storage for program instructions for execution by the at least one processor 802, the same or separate storage can be used for images or data, a removable memory can be available for sharing information with other devices, and any number of communication approaches can be available for sharing with other devices. The device typically will include at least one type of display element 806, such as a touch screen, electronic ink (e-ink), organic light emitting diode (OLED) or liquid crystal display (LCD), although devices such as portable media players might convey information via other means, such as through audio speakers. The device can include at least one communication component 808, as may enabled wired and/or wireless communication of voice and/or data signals, for example, over a network such as the Internet, a cellular network, a Wi-Fi network, BLUETOOTH®, and the like. The device can include at least one additional input device 810 able to receive conventional input from a user. This conventional input can include, for example, a push button, touch pad, touch screen, wheel, joystick, keyboard, mouse, trackball, camera, microphone, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device. As discussed, different approaches can be implemented in various environments in accordance with the described embodiments.

Figure 9:
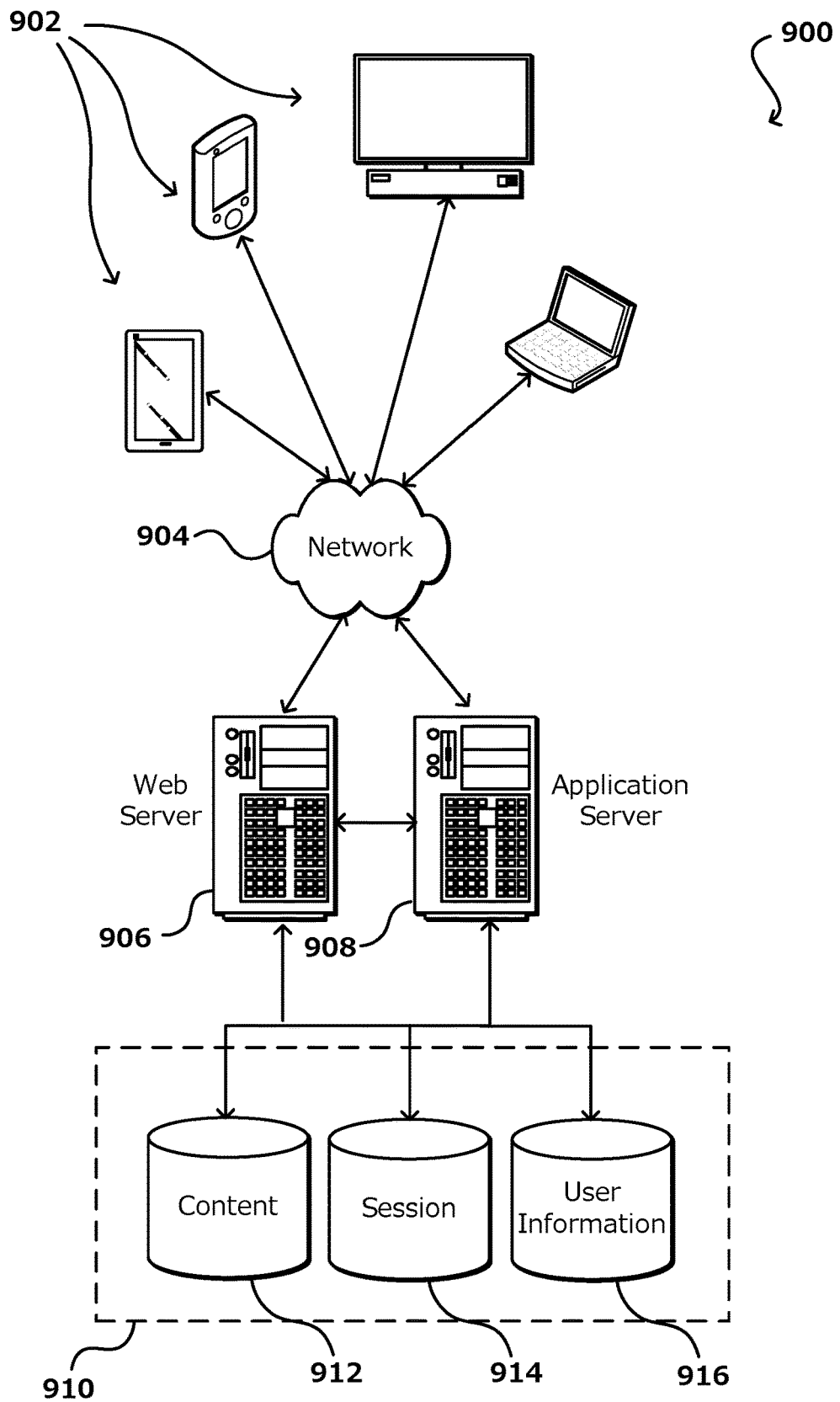
FIG. 9 illustrates an example environment for implementing aspects, in accordance with various embodiments of the present disclosure.

FIG. 9 illustrates an example environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term data "store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   at least one computing device processor; and
   a memory device including instructions that, when executed by the at least one computing device processor, cause the system to:
   receive a search query from a client device for products in an electronic catalog;
   determine a group of related products from the electronic catalog responsive to the search query;
   determine a plurality of product variants within the group, the plurality of product variants defined by one or more attributes having respective attribute values;
   determine, based at least in part on the search query, a primary attribute from the one or more attributes by which to classify the plurality of product variants,
   classify the plurality of product variants into a plurality of classes, an individual class in the plurality of classes corresponding to one or more of the plurality of attribute values;
   determine, in response to the search query, a representative class from the plurality of classes based at least in part on a relevance metric;
   determine, in response to the search query, a representative product variant from the representative class based at least in part on a relevance metric; and
   provide instructions to the client device to display the representative product variant via an interface at the client device in response to the search query, the representative product variant being visually distinguished from one or more other product variants.

2. The system of claim 1, wherein the instructions when executed further cause the system to:
   determine a hierarchy between the one or more attributes, the hierarchy representing a decision tree for the group of related products; and
   determining the primary attribute based at least in part on the hierarchy and one or more parameters specified in the search query.

3. The system of claim 1, wherein the instructions when executed further cause the system to:
   receive user engagement data for the plurality of product variants with respect to the plurality of attribute values;
   determine a degree of distinction between the plurality of attribute values; and
   determine one or more representative classes from the plurality of classes based at least in part on the user engagement data, the degree of distinction, or a combination thereof.

4. The system of claim 1, wherein the instructions when executed further cause the system to:
   receive at least one of relevance ranking of the product variant, user engagement data associated with the product variant, user data associated with the search query, keywords in the search query, or a quality measure of the product variant.

5. A computer-implemented method, comprising:
   identifying a plurality of product variants in a database associated with a search query received from a client device, the plurality of product variants defined by one or more attributes;
   classifying the plurality of product variants into a plurality of classes based on a primary attribute having a plurality of attribute values, the plurality of classes corresponding to the plurality of attribute values;
   determining, by a content server in response to the search query, one or more representative classes from the plurality of classes based on relevance or engagement data;
   determining, by the content server in response to the search query, a representative product variant from each of the one or more representative classes based on relevance or engagement data;
   presenting the one or more representative product variants via an interface at the client device in response to the search query, the selected product variant being visually distinguished from one or more other product variants.

6. The method of claim 5, further comprising:
   determining the primary attribute based at least in part on a hierarchy between the one or more attributes.

7. The method of claim 5, further comprising:
   determining the primary attribute based at least in part on a one or more keywords in the search query.

8. The method of claim 5, further comprising:
   determining the primary attribute value based at least in part on engagement data of with the plurality of product variants with respect to the plurality of attribute values.

9. The method of claim 8, wherein the engagement data includes at least one of sales data or browsing data.

10. The method of claim 5, further comprising:
    determining one or more attribute values from the plurality of attribute values based at least in part on a degree of distinction between the one or more attribute values.

11. The method of claim 5, further comprising:
    determining the representative product variant based at least in part on at least one of a relevance ranking of the product variant, user engagement data associated with the product variant, user data associated with the search query, keywords in the search query, or a quality measure of the product variant.

12. The method of claim 5, further comprising:
    determining a product offer from a plurality of product offers associated with the representative product variant.

13. The method of claim 12, further comprising:
    determining the product offer based at least in part on at least one of a quality measure of the product offer, availability of the product offer, or a condition associated with the product offer.

14. The method of claim 5, further comprising:
    identifying a new product variant;
    receiving engagement data associated with the new product variant; and determining the representative product variant of the plurality of product variants having the attribute value based at least in part on the engagement data associated with the new product variant.

15. The method of claim 5, further comprising:
receiving a user input; and
determining one or more additional product variants having the attribute value.

16. A system, comprising:
at least one computing device processor; and
a memory device including instructions that, when executed by the at least one computing device processor, cause the system to:
  identify a plurality of product variants in a database associated with a search query received from a client device, the plurality of product variants defined by one or more attributes;
  classify the plurality of product variants into a plurality of classes based on a primary attribute having a plurality of attribute values, the plurality of classes corresponding to the plurality of attribute values;
  determine, by a content server, one or more representative classes from the plurality of classes based on relevance or engagement data;
  determine, by a content server, a representative product variant from each of the one or more representative classes based on relevance or engagement data;
  present the one or more representative product variants via an interface at the client device in response to the search query, the selected product variant being visually distinguished from one or more other product variants.

17. The system of claim 16, wherein the instructions when executed further cause the system to:
determine one or more attribute values from the plurality of attribute values based at least in part on a degree of distinction between the one or more attribute values.

18. The system of claim 16, wherein the instructions when executed further cause the system to:
determine the primary attribute based at least in part on a hierarchy between the one or more attributes.

19. The system of claim 16, wherein the instructions when executed further cause the system to:
determine the primary attribute based at least in part on a one or more keywords in the search query.

20. The system of claim 16, wherein the instructions when executed further cause the system to:
determine the attribute value based at least in part on engagement data of with the plurality of product variants with respect to the plurality of attribute values, wherein the engagement data includes at least one of sales data or browsing data.

* * * * *